(12) United States Patent
Marsh et al.

(10) Patent No.: US 7,832,788 B2
(45) Date of Patent: Nov. 16, 2010

(54) GOLF CART COVER MAGNETIC DOOR

(76) Inventors: Donald Lee Marsh, 575 Kings Peak Dr., Alpharetta, GA (US) 30022; Robert Spencer Sappington, 15960 Timbergap Crossing, Alpharetta, GA (US) 30004

( * ) Notice: Subject to any disclaimer, the term of this patent is extended or adjusted under 35 U.S.C. 154(b) by 192 days.

(21) Appl. No.: 12/017,040

(22) Filed: Jan. 20, 2008

(65) Prior Publication Data
US 2009/0183808 A1 Jul. 23, 2009

(51) Int. Cl.
*B60J 1/08* (2006.01)
(52) U.S. Cl. .................. 296/146.1; 296/146.9; 296/83; 296/139
(58) Field of Classification Search ............ 296/146.1, 296/147, 148, 79, 77.1, 146.9, 83, 145, 139
See application file for complete search history.

(56) References Cited

U.S. PATENT DOCUMENTS

| | | | | |
|---|---|---|---|---|
| 2,717,036 A | * | 9/1955 | Harris | 160/354 |
| 4,688,846 A | * | 8/1987 | Martin, Jr. | 296/102 |
| 4,773,694 A | * | 9/1988 | Gerber | 296/77.1 |
| 5,217,275 A | * | 6/1993 | Ridge | 296/77.1 |
| 5,259,656 A | * | 11/1993 | Carroll | 296/77.1 |
| 5,393,118 A | * | 2/1995 | Welborn | 296/147 |
| 5,429,404 A | * | 7/1995 | King, Sr. | 296/79 |
| 6,158,801 A | * | 12/2000 | Tucker | 296/146.1 |
| 6,276,745 B1 | * | 8/2001 | Wilson | 296/155 |
| 6,439,637 B1 | * | 8/2002 | Tyrer | 296/79 |
| 6,776,445 B1 | * | 8/2004 | Conner et al. | 296/79 |
| 6,869,127 B2 | * | 3/2005 | Dohle | 296/146.1 |
| 7,354,092 B2 | * | 4/2008 | Showalter et al. | 296/77.1 |
| 7,429,072 B2 | * | 9/2008 | Orrell | 296/146.12 |

* cited by examiner

*Primary Examiner*—Glenn Dayoan
*Assistant Examiner*—Gregory Blankenship

(57) ABSTRACT

An improved door design for soft-sided golf cart covers increases the ease of entry and exit. This product features a horizontal swing out design that removes the need for snaps or zippers and significantly increases size of the door opening. This improved door design features a magnetic door that eliminates zipper failure, simplifies entry and exit and improves the overall golf cart cover experience and longevity of the cover.

8 Claims, 21 Drawing Sheets

Typical Golf Cart

Typical Golf Cart

Typical 2 zipper cover with zippers in closed position

Typical two-zipper Golf Cart Cover unzipped

Typical single-zipper Golf Cart Cover

Typical single-zipper Golf Cart Cover unzipped

Typical curved-zipper Golf Cart Cover

Typical curved-zipper Golf Cart Cover unzipped

Golf Cart Cover with Magnetic Doors

Left Magnetic Door
Open Position

Left Side Magnetic Door Features

Magnets seek

Magnets attract

Magnet strips attached

Door Open Features

Door held open using magnet strip

Right Door closed inside view

View of typical zippered cover on golf cart

Magnetic Door open position on typical golf cart

GOLF CART COVER MAGNETIC DOOR

The present invention is for an improved door mechanism for a portable golf cart cover. The door construction will mirror the golf cart cover (e.g. cloth, vinyl, polyester). The door will be designed to swing away on the outside of the side panel towards the front of the cart. The door will be connected to the cart cover at the front. The top and rear of the door will utilize magnetic strips containing permanent magnet discs. The door magnetic strips will attach to cooperating magnetic strips mounted on the cart cover side panel and cooperating magnetic strips mounted from the roof of the cart cover. Each magnetic strip will have individual pockets containing permanent magnets. The pockets will be at least twice the size of the individual magnets to allow the magnet to move inside the pocket, as cooperating magnets are moved near the pocketed magnet. The magnetic strips will be positioned, such that the door magnetic strips will meet and attach to the cart cover side panel and cart cover top magnetic strips. The top magnetic strip will be suspended from the cart cover top such that it can be positioned either inside or outside the closed door. If raining the top magnetic strip can be positioned outside the closed door.

The permanent magnets will be rare earth (neodymium) disc magnets. They will be approximately ¾" in diameter. They will be positioned such that the north pole of one faces the south pole of the cooperating magnet so the two partner magnets will appropriately attract each other. The magnets will be positioned approximately 6 inches apart to allow for a solid door closing and to allow for the occupant to reach his or her hand between the magnets to enable easier opening and closing assistance.

The cart cover may have one or more techniques to easily and reliably keep the magnetic door in the open position. One, the cart cover may have open connectors (open connectors may be side-release buckles, hook connectors or other quick attachment method) properly positioned near the cart front support posts. There should be two or three of these connectors to securely hold the door in the open position when the cart is being driven. Second, the door may have cooperating open magnetic strips to hold the door in the open position. Third, the door magnetic strips may be directed to attach to the metal cart front roof support post.

The door will be appropriately reinforced along the fold line to prevent tearing of the vinyl/cloth door fabric.

CROSS-REFERENCE TO RELATED APPLICATIONS

U.S. Pat. No. 5,975,615—Showalter—Nov. 2, 1999
U.S. Pat. No. 6,439,637—Tyler—Aug. 27, 2002
U.S. Pat. No. 6,916,059—Feinberg—Jul. 12, 2005
U.S. Pat. No. 5,388,881—Spencer—Feb. 14, 1995
U.S. Pat. No. 4,013,315—West—Mar. 22, 1977
U.S. Pat. No. 5,217,275—Ridge—Jun. 8, 1993
U.S. Pat. No. 5,259,656—Carroll—Nov. 9, 1993
U.S. Pat. No. 3,827,019—Serbu—Jul. 30, 1974

DETAILED DESCRIPTION OF THE PREFERRED EMBODIMENTS

U.S. Pat. No. 5,975,615 to Showalter describes a soft cover bracket that enables the front edges of the side panels of a soft cover to be connected to the frame supporting the front of the cart top. The front side panel has a zipper that allows the side panel to be opened. The occupant must reach forward to the front windshield edge to unzip the door to exit the enclosure. A more difficult process than the simple horizontal swing out technique described in this application.

U.S. Pat. No. 6,439,637 to Tyler describes a cart cover that utilizes a door with two vertical zippers. The occupants must unzip one or both of the zippers to enable exit. With only one zipper raised the top opening is small and difficult for occupants to enter and exit. When both zippers are raised the opening is much larger however the occupant must lower both zippers to close off cold, wind and rain.

U.S. Pat. No. 6,916,059 to Feinberg describes a cart cover that employees a curved zippered swing away door. While this is an improvement over vertical zippered doors the occupant must still deal with the inherent unreliability of zippers. Zippers are designed to function in a straight line. Any time a zipper is curved it causes the zipper teeth to be either closer together or further apart than designed. This curved zipper approach forces the zipper from the track, causes the zipper to stick, and causes excess tension on stitching, which causes the zipper and stitching to separate.

U.S. Pat. No. 5,388,881 to Spencer describes a cart cover that employs doors that are raised from the bottom to enable occupant ingress and egress. While this application does not use zippers, lifting the side panel that is permanently attached to the front and the top of the cover, creates an awkward ingress and egress opening. The door is opened by disconnecting an armrest connector and lifting the door to create an opening. The magnetic swing away door described in this application is a much simpler technique to quickly open and close the cover door and keep cold and wind from the enclosure.

U.S. Pat. No. 4,013,315 to West describes a cart cover where the side panels are tied to the front and real panels. Entry and exit is accomplished by untying and retying straps to un-secure and secure the side panels. This is much more time consuming than a magnetic door approach. In addition the side panels in this embodiment do not reach to the cart floorboards and wind and cold can easily enter the enclosure.

U.S. Pat. No. 5,217,275 to Ridge describes a cart cover that employs a single vertical zipper for ingress and egress. This embodiment opens to the top of the door, which results in a very small opening that is very difficult for occupants to enter or exit.

U.S. Pat. No. 5,259,656 to Carroll describes a cart cover that employs a vertical center zipper for normal entry plus a second zipper to allow the side to be rolled up and secured under the roof. This embodiment also opens to the top of the door, which results in a very small opening that is very difficult for occupants to enter or exit. If the side is rolled up it creates a large door, however zippers are again used in this embodiment.

U.S. Pat. No. 5,429,404 to King describes a permanent cart cover that employs a series of vertical plastic strips anchored to the cart body by permanent magnets. While unique, this door design approach requires electro magnets or a steel cart frame to be a viable as a portable golf cart cover door.

U.S. Pat. No. 3,827,019 to Serbu describes magnetic closure that replaces a zipper using rectangular shaped permanent magnets that run downwardly from an apex where two borders join. This proposed invention uses magnets to enhance downward zipper reliability. If used in a golf cart cover door application this zipper like motion would results in a small opening at the top. This invention must be precisely aligned to ensure a solid close. To be used for a golf cart cover door the magnetic configuration must accommodate an imprecise opening and closing environment. The magnets must move, plus the magnets in this application are positioned too close to each other to enable the occupant to reach their hand between the spaces in the magnets during high wind conditions to ensure complete closure.

STATEMENT REGARDING FEDERALLY SPONSORED RESEARCH OR DEVELOPMENT

NA

REFERENCE TO SEQUENCE LISTING, A TABLE, OR A COMPUTER PROGRAM LISTING COMPACT DISC APPENDIX

NA

BACKGROUND OF THE INVENTION

This invention relates generally to the field of soft golf cart covers, specifically to an improved door opening that quickly and reliably opens and closes to protects the passengers from cold, wind and rain, while also improving entry and exit convenience.

Golf cart covers are utilized today to protect the occupants from cold, wind and rain. The covers generally wrap cart openings in front, sides and rear with vinyl, cloth or other materials.

Golf carts typically have hard top covers to protect the occupants from the sunlight. Golf cart covers generally attach to or are supported by the top of the cart and have the side panels of the cover secured to the body of the cart Golf cart covers today are one of two types. One type is installed semi-permanently and remains on throughout the cold weather season. The second type is portable and loosely shaped to fit most cart manufacturers. The portable covers tend to be either over-the-top models with four sides or under-the-top models with three sides.

Most patented golf cart cover products in the market today, use zippered openings to enable ingress and egress. Since portable golf cart covers must fit a variety of carts from different manufacturers, the zippered openings typically have a closed end at the top to ensure the zippers can be reliably opened and closed. This closed end results in a very small opening for ingress and egress. The zippers must accommodate different degrees of tension to accommodate the different sizes and shapes of golf cart models, which results in zipper tension during closing and opening causing zipper failure over time.

Cart cover zippers are manufactured, using one of three designs:

In the first zipper design (FIG. 2), the door has two vertical zippers. The occupants must unzip one or both of the zippers to enable exit. With only one zipper raised the top opening is again small and difficult for occupants to enter and exit. When both zippers are raised the opening is much larger however the occupant must re-lower both zippers to close off cold, wind and rain.

In the second zipper design (FIG. 3), the cart cover side has a single vertical zipper that is raised or lowered for the occupant to enter and exit the enclosure. This zipper type opens towards the top of the cart side, which results in a very small opening that tends to be difficult for large occupants to enter or exit.

In the third zipper design (FIG. 4), the door has a curved zipper that forms a small swing away door with a larger door opening. While this is an improvement over vertical zippered doors the occupant must still deal with the inherent unreliability of zippers.

Most golf cart covers have doors or sides that roll-up during good weather to enable easier ingress and egress. The roll-up approach can be time-consuming and difficult during cold conditions since the vinyl used becomes less pliable and does not easily bend or roll. This vertical roll-up process was implemented to allow for airflow during improved weather and to enable easier ingress and egress, especially for large occupants Golf cart zippers are inherently unreliable. Because zippers are mechanical, they are prone to break, and tear. Most portable covers when installed can stretch a door side, which adds tension on the zippers and contributes to door zipper failure. The teeth snag in material, thread, vinyl or plastic. The teeth can get out of sync with each other and bend or break. Zippers can separate from material over time, due to shrinking, caused by weather. Because of limited entrance and exit space the teeth can snag in clothing. In short, there is a high probability that zippers will jam or fail over time.

Therefore, an improved golf cart cover door, using magnet strip technology, that eliminates zippers, swings open horizontally to create a spacious opening and eliminates the need to perform rollup and strapping tasks is desired and needed.

BRIEF SUMMARY OF THE INVENTION

The present invention provides an improved golf cart cover door which features an innovative magnetic door with a horizontal swing-away open/close motion that is significantly easier to ingress and egresses.

OBJECTS AND ADVANTAGES OF INVENTION

To provide a golf cart cover door that uses magnetic strip technology and eliminates zippers, which are the major point of failure for traditional golf cart covers.

To provide a golf cart cover door that swings away to create a more spacious door opening for easier ingress and egress by occupants.

To provide a golf cart cover door that is significantly easier to open and close than traditional zipper doors

DETAILED DESCRIPTION OF THE INVENTION

Figure 1:
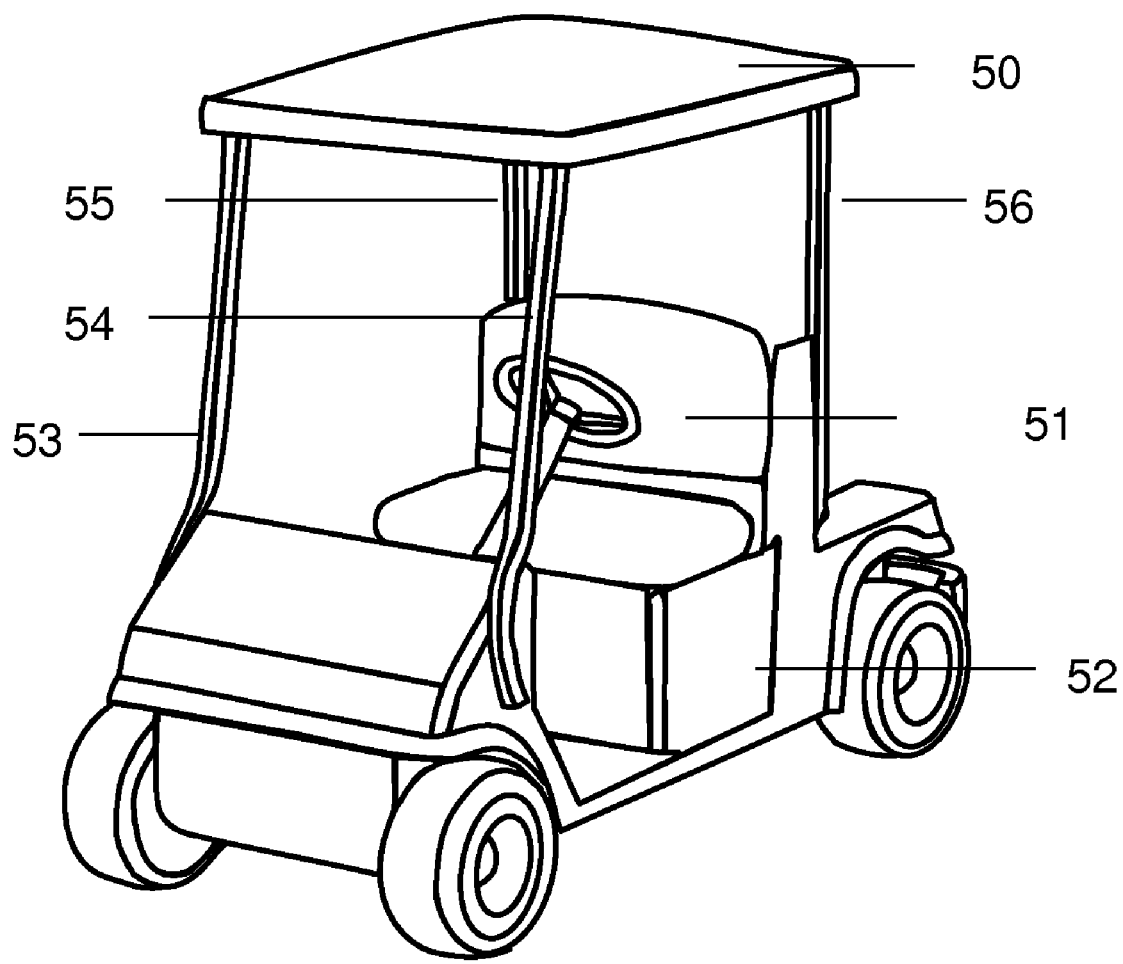
FIG. 1—is a perspective view of a typical golf cart referenced in this application.

The present invention will now be described in detail. Referring now to FIG. 1, is a drawing of a typical motorized golf cart before a cart cover has been attached. The proposed invention enhances golf cart covers that cover this cart. The cart has a passenger compartment [51] for sitting passengers, a cart body, [52] cart top [50], (vertically extending and laterally spaced apart front and rear frame members, [53], [54] and [55], [56] respectively, that support cart top [50].

Figure 2A:
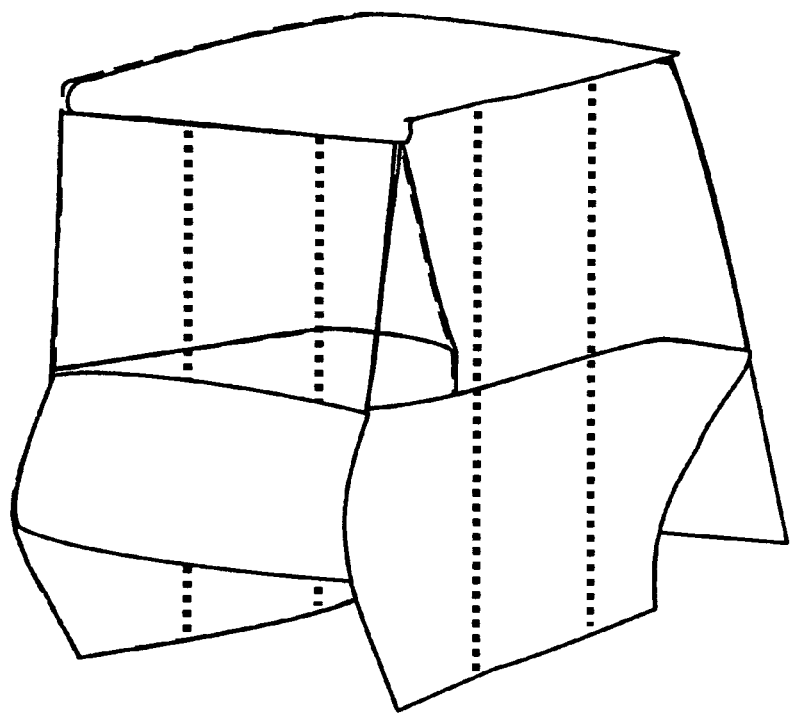
FIG. 2A—is a view of a typical golf cart cover with a two-zipper configuration
Figure 2B:
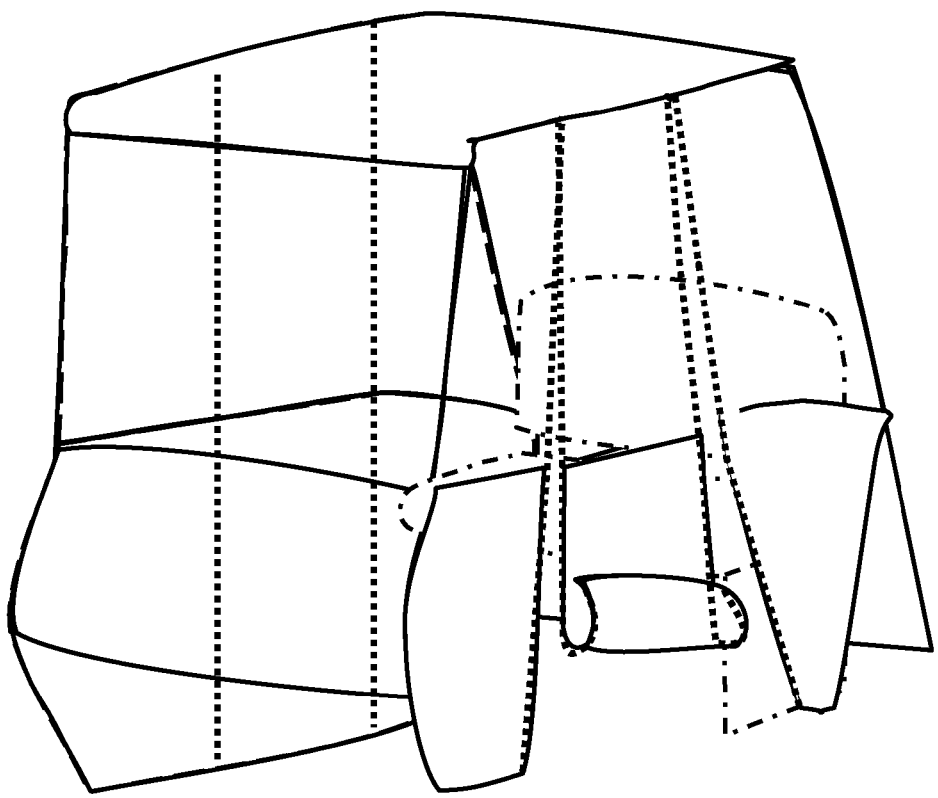
FIG. 2B—is a view of a typical golf cart cover with a two-zipper configuration in the open position FIG. 3A—is a view of a typical golf cart cover with a single zipper configuration FIG. 3B—is a view of a typical golf cart cover with a single zipper configuration in the open position FIG. 4A—is a view of a typical golf cart cover with a curved zipper configuration FIG. 4B—is a view of a typical golf cart cover with a curved zipper configuration in the open position FIG. 5A—is a view of a left side magnetic door golf cart cover configuration FIG. 5B—is a view of a left side magnetic door golf cart cover configuration in the open position FIG. 6A—is a detailed feature view of a closed right side magnetic door FIG. 6B—is a detailed feature view of a closed inside left side magnetic door FIG. 7A—shows magnetic strip seek properties FIG. 7B—shows magnetic strip attract properties FIG. 7C—shows magnetic strip attach properties FIG. 8—is an outside view of a closed left side magnetic door FIG. 9—is an outside view of a closed left side magnetic door partially open FIG. 10A—is an outside view of an open left side magnetic door using open magnetic strips FIG. 10B—is an outside view of an open left side magnetic door using open connectors FIG. 11—is an inside view of a right side closed magnetic door.

FIG. 2—is a drawing of a typical golf cart cover that uses a vertical two-zipper approach for occupant ingress and egress. FIG. 2A shows the zippers in a closed position and FIG. 2B in an open position. To enter and exit this cart cover door configuration, the occupant must unzip and zip either one or both zippers. Because zippers are mechanical, they are prone to snag, break, and tear. As the weather improves the occupant must unzip the door zippers and roll the door up to the roof and secure with straps. As the drawing shows, the zipper creates a very small opening at the roofline, thus making it difficult for larger persons to ingress and egress.

Figure 3A:
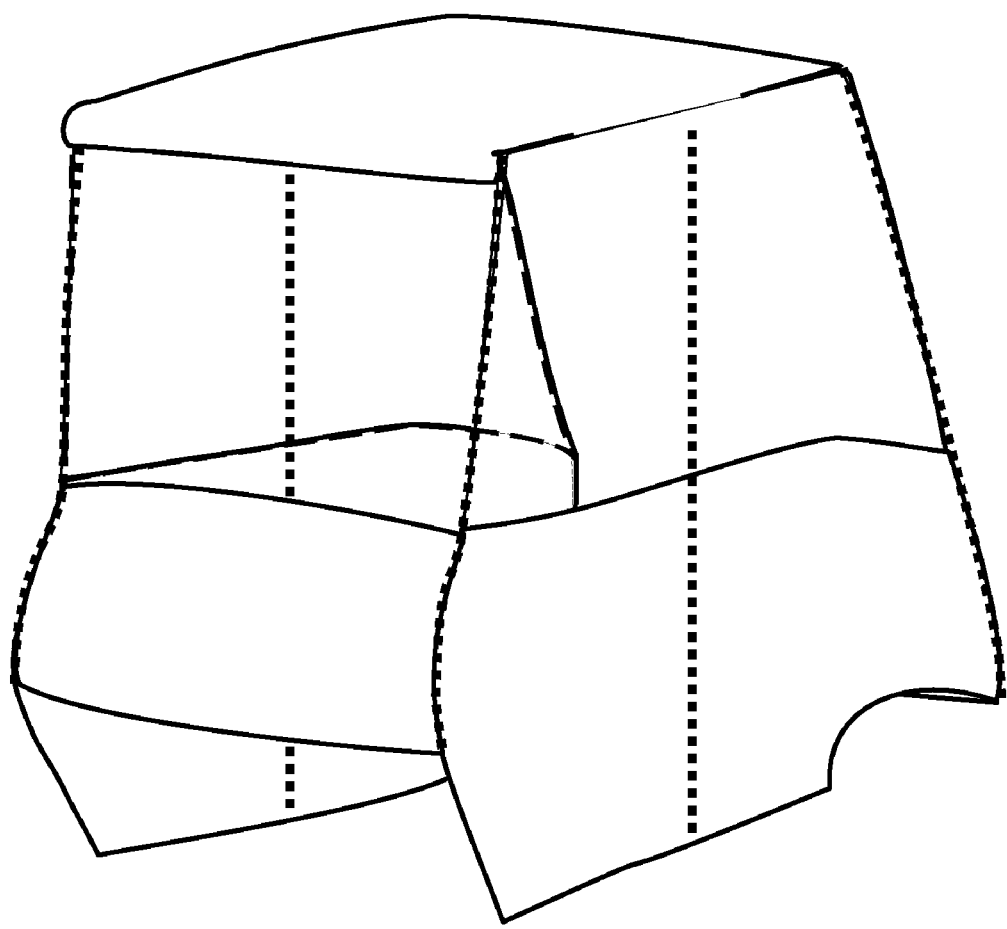
Figure 3B:
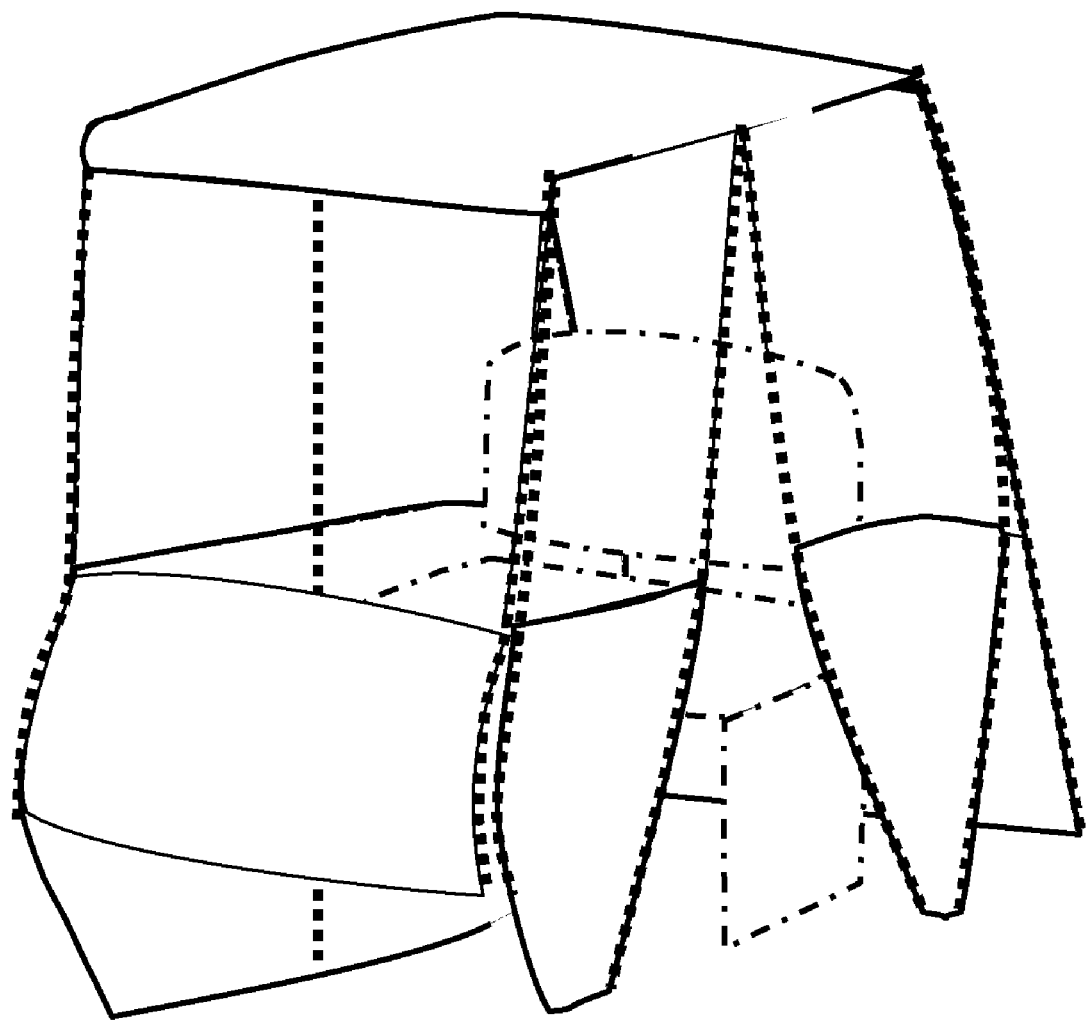

FIG. 3—is a drawing of a typical golf cart cover that uses a vertical single zipper approach for occupant ingress and egress. FIG. 3A shows the zipper in a closed position and FIG. 3B in an open position. To enter and exit this cart cover door configuration, the occupant must unzip and zip the single vertical zipper.

Because zippers are mechanical they are prone to snag, break, and tear. As the weather improves, the occupant may unzip the zippers located on the cart cover corners in addition to the center vertical zipper, roll-up either the front or rear sides or both sides to the roof and secure with straps. As the drawing shows, the zipper creates a very small opening at the roofline, thus making it difficult for larger persons to ingress and egress.

Figure 4A:
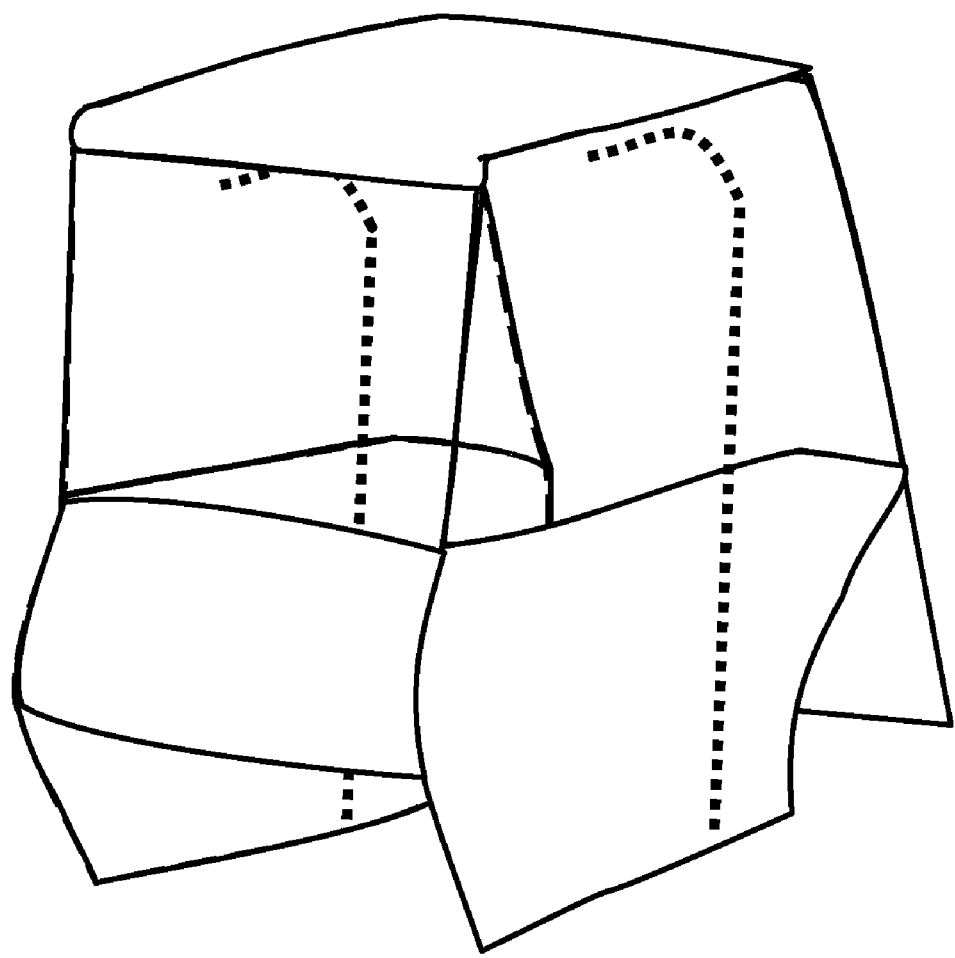
Figure 4B:
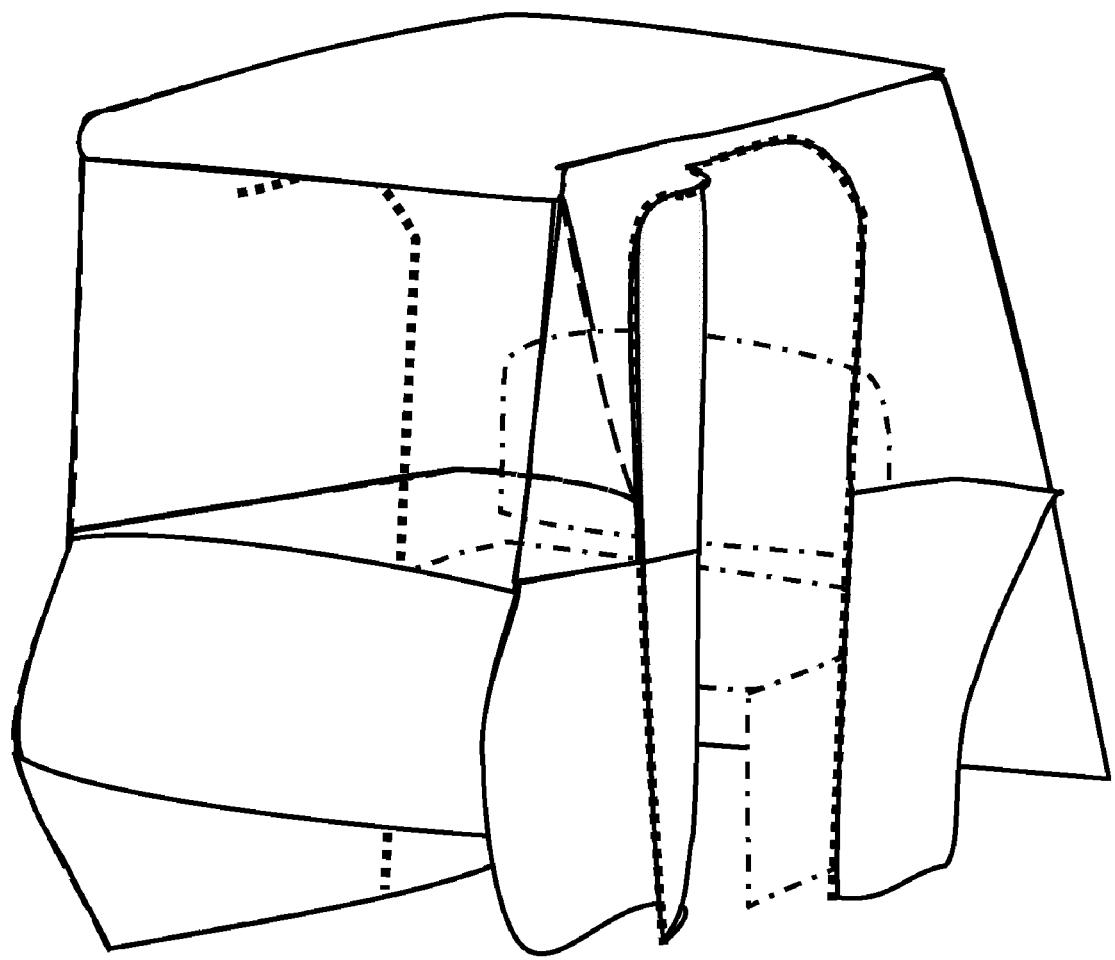

FIG. 4—is a drawing of a typical golf cart cover that uses a curved zipper approach for occupant ingress and egress. FIG. 4A shows the zipper in a closed position and FIG. 4B in an open position. To enter and exit this cart cover door configuration, the occupant must unzip and zip the single curved zipper. Because zippers are mechanical they are prone to snag, break, and tear. As the weather improves, the occupant may unzip the zipper located on the cart cover corners in addition to the center vertical zipper, and secure the door in the open position. As the drawing shows, the zipper top is located below the roofline, which causes the top of the door opening to be lower than desired, thus making it difficult for larger persons to ingress and egress.

Figure 5A:
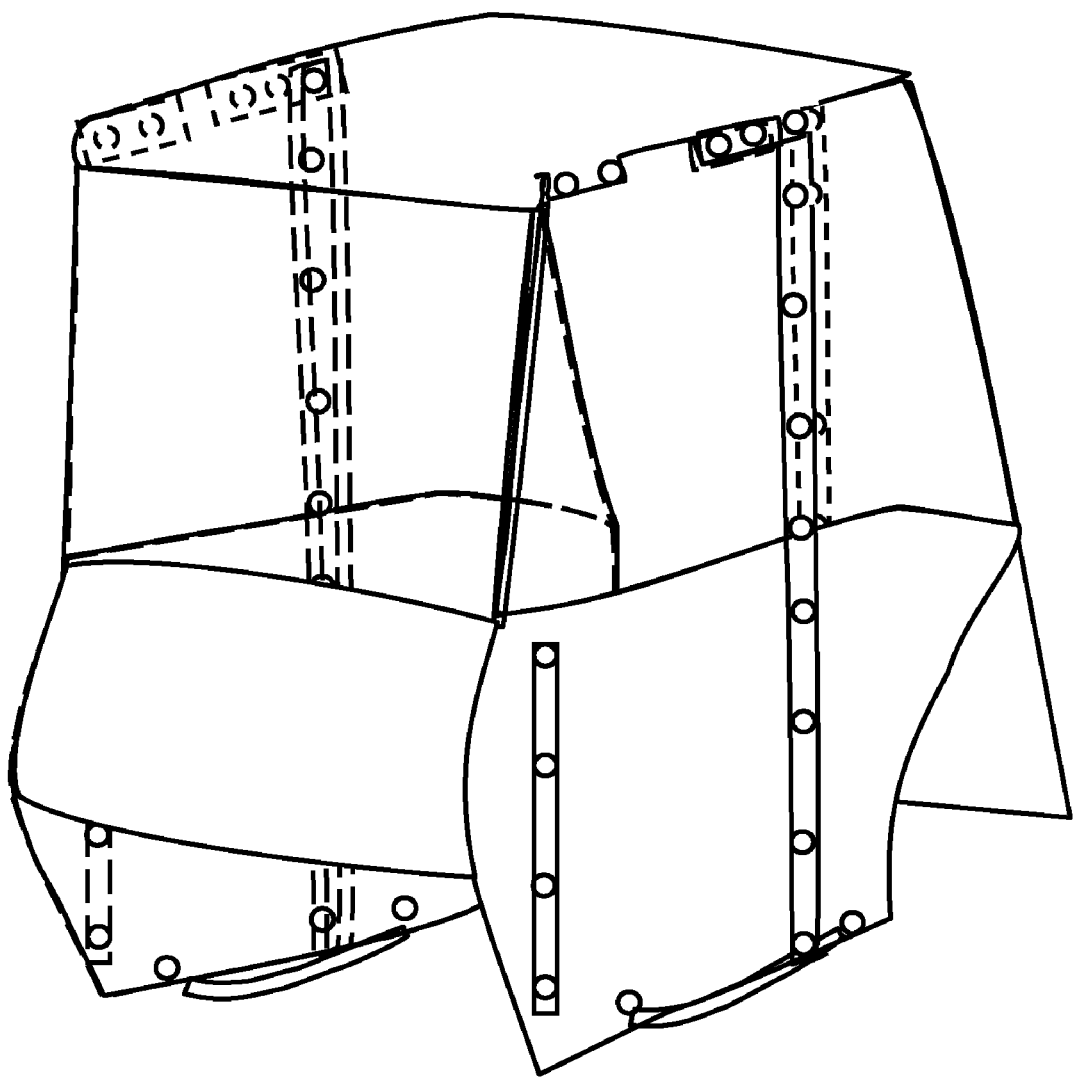
Figure 5B:
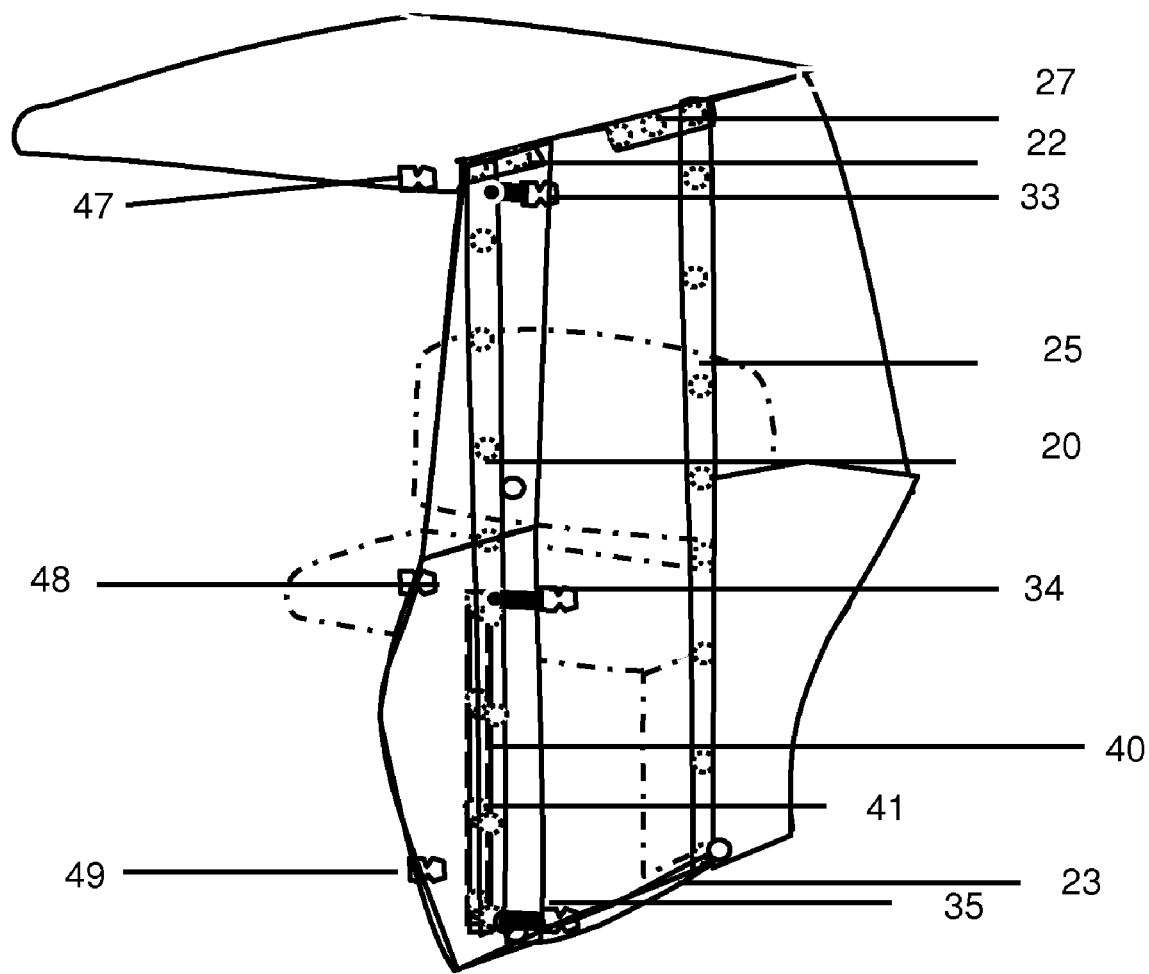

FIG. 5—is a drawing of a golf cart cover magnetic door configuration for occupant ingress and egress. FIG. 5A shows the magnetic door in a closed position and FIG. 5B in an open position. The top magnetic strips [22], [27] separate and allow the door to horizontally swing open, creating a spacious opening at the bottom and top. This is a significant improvement for all golf cart occupants, especially larger individuals. The door has a vertical magnetic strip [20] along door edge that seeks and attaches to a side close magnetic strip [25]. The door has a horizontal top magnetic strip [22] along top edge of the door that seeks and attaches to the left top panel magnetic strip [27]. The door can be swung open towards the front of cart for easy access. The door is automatically held open by an open magnetic strip [40] and/or side open connectors [46], [47] and [48] (open connectors may be side-release buckles, hook connectors or other quick attachment method). The door has inside pull straps with connectors (side-release buckles, hook connectors or other quick attachment device) attached [33], [34], [35] to aid in opening and closing the door. In addition to aiding in door opening and closing, the inside pull strap connector can be connected to side open connectors [46], [47] and [48] to secure the door in the open position in high wind conditions or while driving. The door bottom features a support strap [23] to keep the size of door opening constant, which ensures the door open and close magnets will always find each other.

Figure 6A:
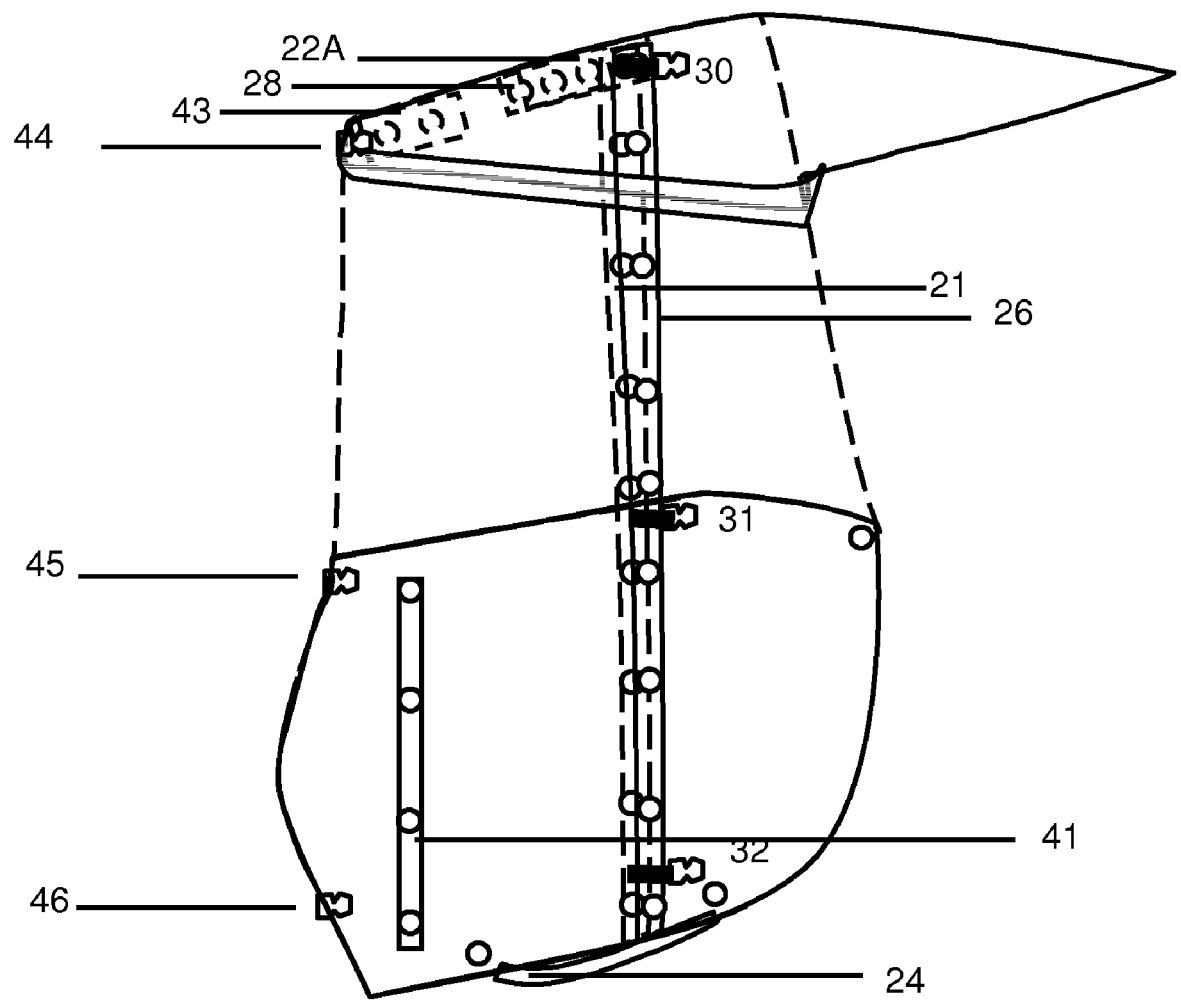
Figure 6B:
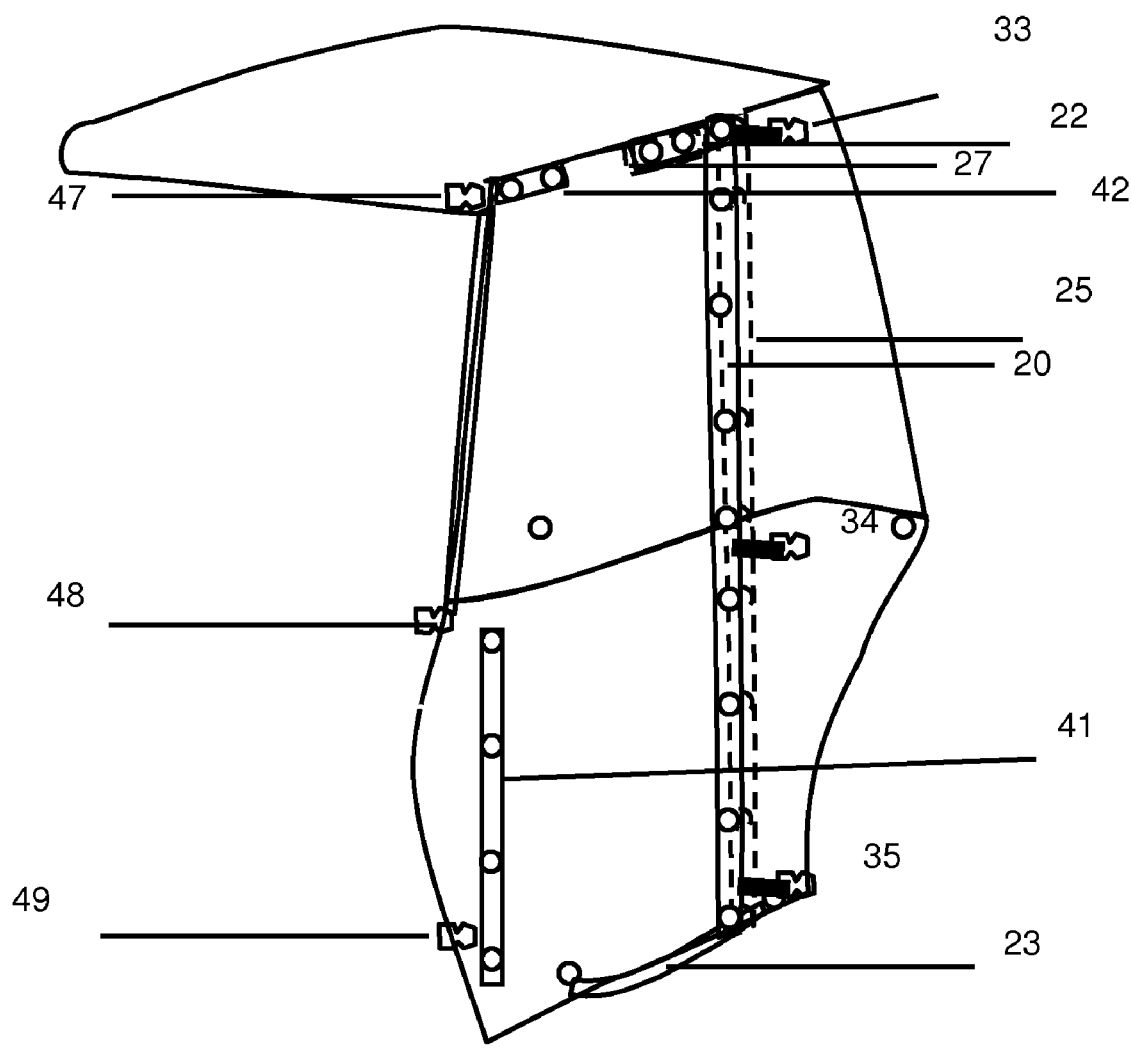

FIG. 6 shows a detailed feature listing of both a right side door in FIG. 6A and a detailed feature listing of a left side door in FIG. 6B FIG. 6A shows a right side door magnetic vertical strip [21] and door magnetic top strip [22A]. Also shown are the side close vertical magnetic strip [26] and right side top magnetic close strip [28]. The right side door vertical magnetic strip, when opened connects to the side vertical open magnetic strip [41]. The right side door top magnetic strip [22A] when opened connects to the top right side panel open magnetic strip [43]. The right side door has three close strips [30], [31], [32] which the occupant can use to assist in closing. In addition, the door close strips can be connected to door open connectors [44], [45], [46] to alternatively be used to keep the door in the open position while the cart is moving.

FIG. 6B—shows a detailed listing of the left side magnetic door features. Left side door magnetic vertical strip [20], left side door magnetic top strip [22], left side close vertical magnetic strip [27], left side top magnetic close strip [27], left side vertical open magnetic strip [40], top left side panel open magnetic strip [42], three left side close strips [33], [34], [35], and left door open connectors [47], [48], [49].

FIG. 7—describes the key component of this invention, the magnetic strip. The magnetic strip consists of a long piece of cloth with rare earth magnets sewn into pockets at appropriate intervals. The rare earth magnets [9] pull (attract) appropriately aligned magnets or steel plugs towards each other. Magnetic strip pockets [8] are sewn with rare earth magnets [9] inside the pockets. When assembled, the magnetic strips seek appropriately aligned magnetic strips and attach to each other. A critical advantage of the magnetic strips is that they consistently pull (attract) [10] each other together and attach in the proper position. This enables the magnetic doors to open or close correctly time after time.

Figure 7A:
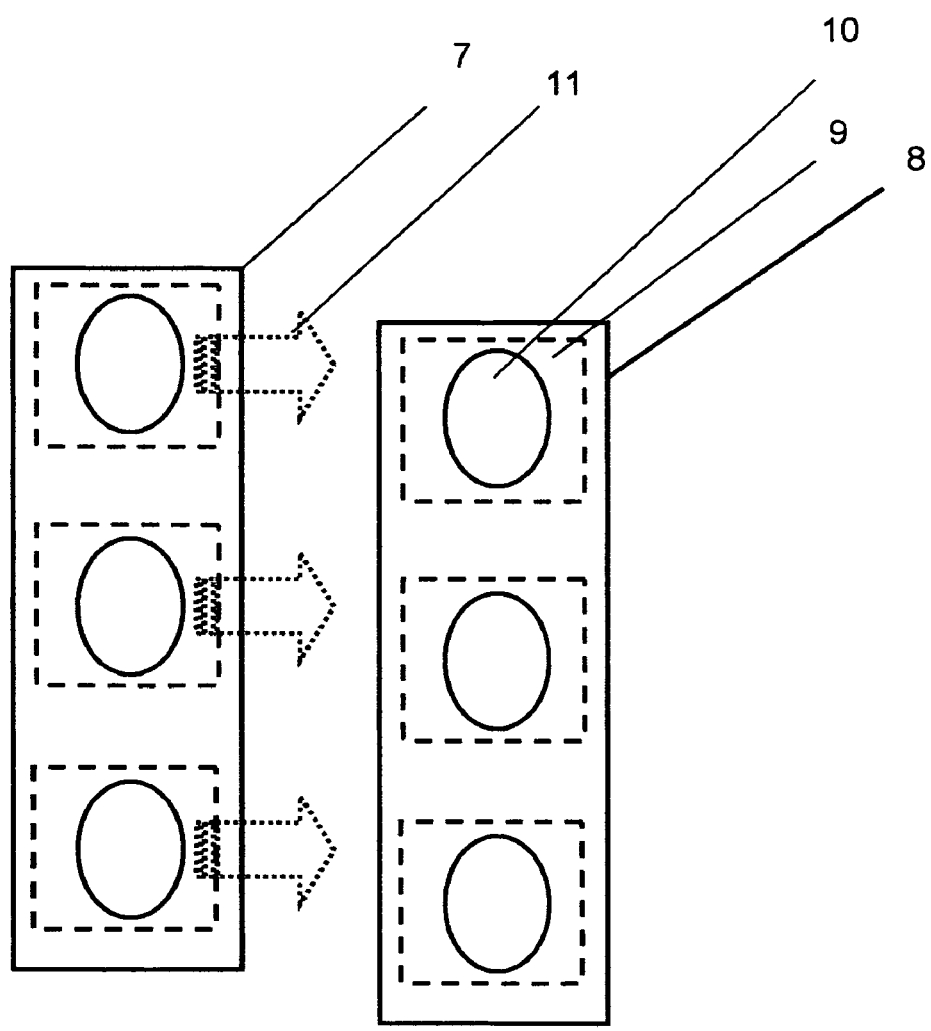

FIG. 7A shows two magnetic strips [7] and [8] seeking each other.

Figure 7B:
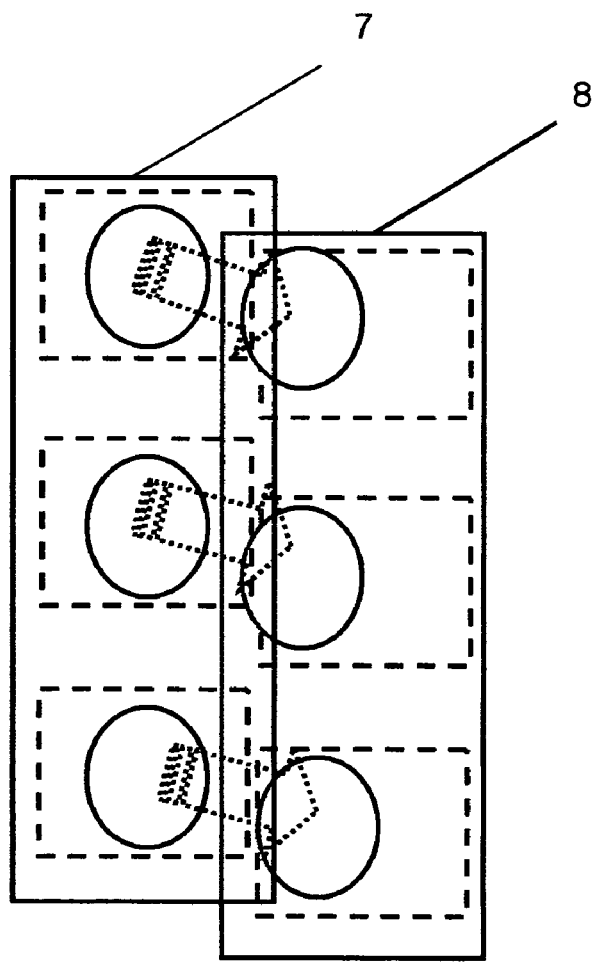

FIG. 7B shows two magnetic strips [7] and [8] pulling (attracting) each other together. The strips are made with magnetic pockets that house individual permanent magnets. Each pocket is larger than individual magnets, which allows magnets to move within the pocket to find and attach to cooperating magnets in the near vicinity. This loose pocket magnet design enables a reliable attachment in an imprecise environment created by dissimilar golf cart manufacturers. Zipper teeth must be perfectly aligned each time or they will tend to get out of synch and cause failure.

Figure 7C:
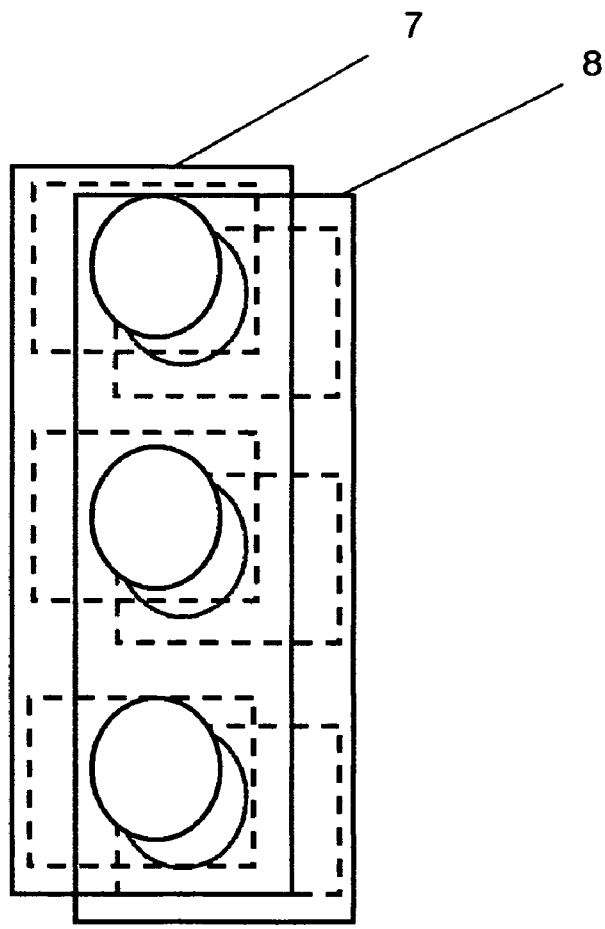

FIG. 7C shows two magnetic strips [7] and [8], attached to each other even though not properly aligned.

Figure 8:
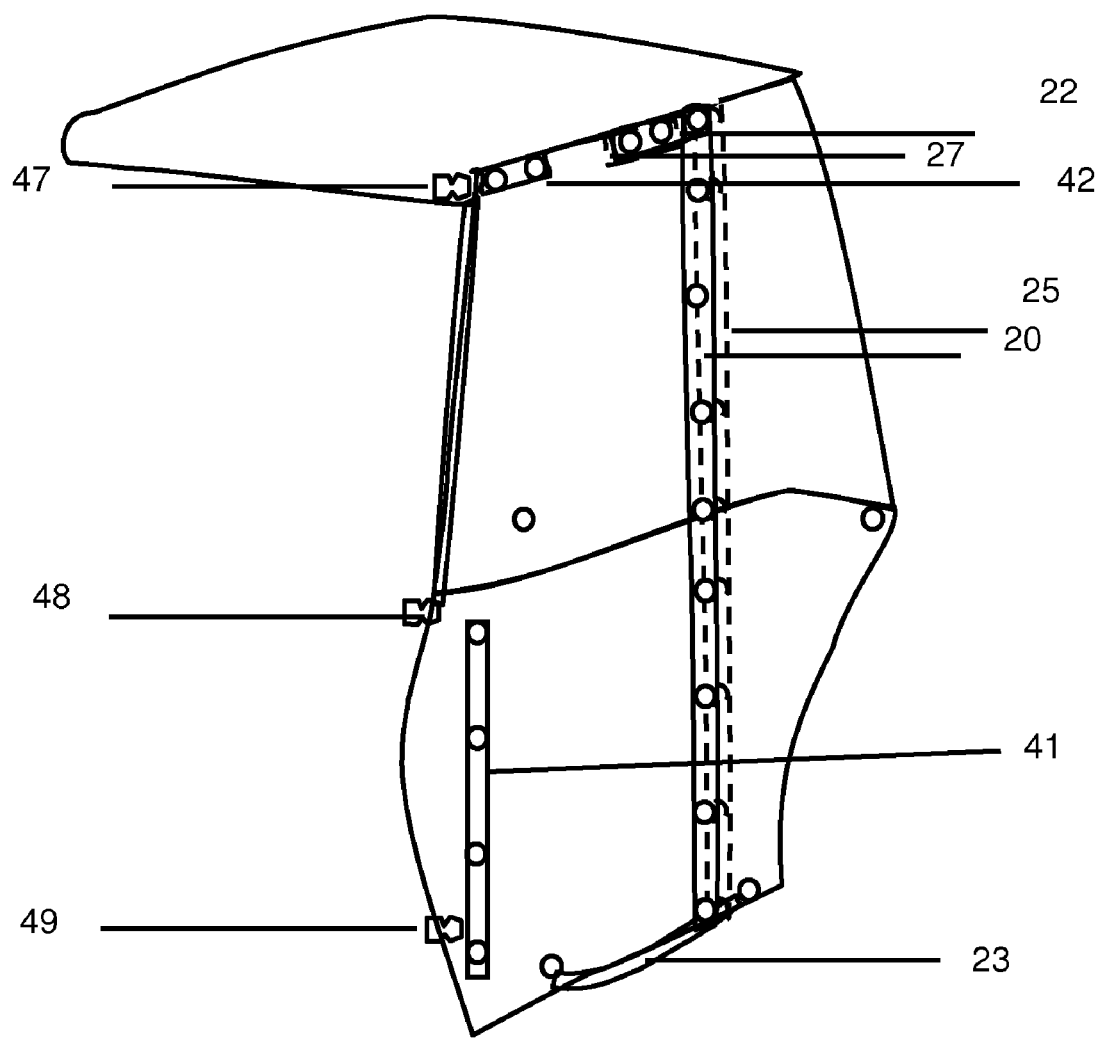

FIG. 8, is a view of the left side magnetic door. The left door has a vertical door magnetic strip [20] that connects to the left side vertical magnetic close strips [25] to keep the door closed. There is also a left side door top magnetic door strip [22] and top close strips [27] that keep the door top sealed during rainy and windy conditions. Additionally the left side door magnetic strip, when opened connects to an open magnetic strip [40]. Also shown is the left side door lower door support strap [23] to keep the door opening the same size, which ensures the magnets will reliably meet each time the door is closed. The left side door has three door close straps [33], [34], and [35].

Figure 9:
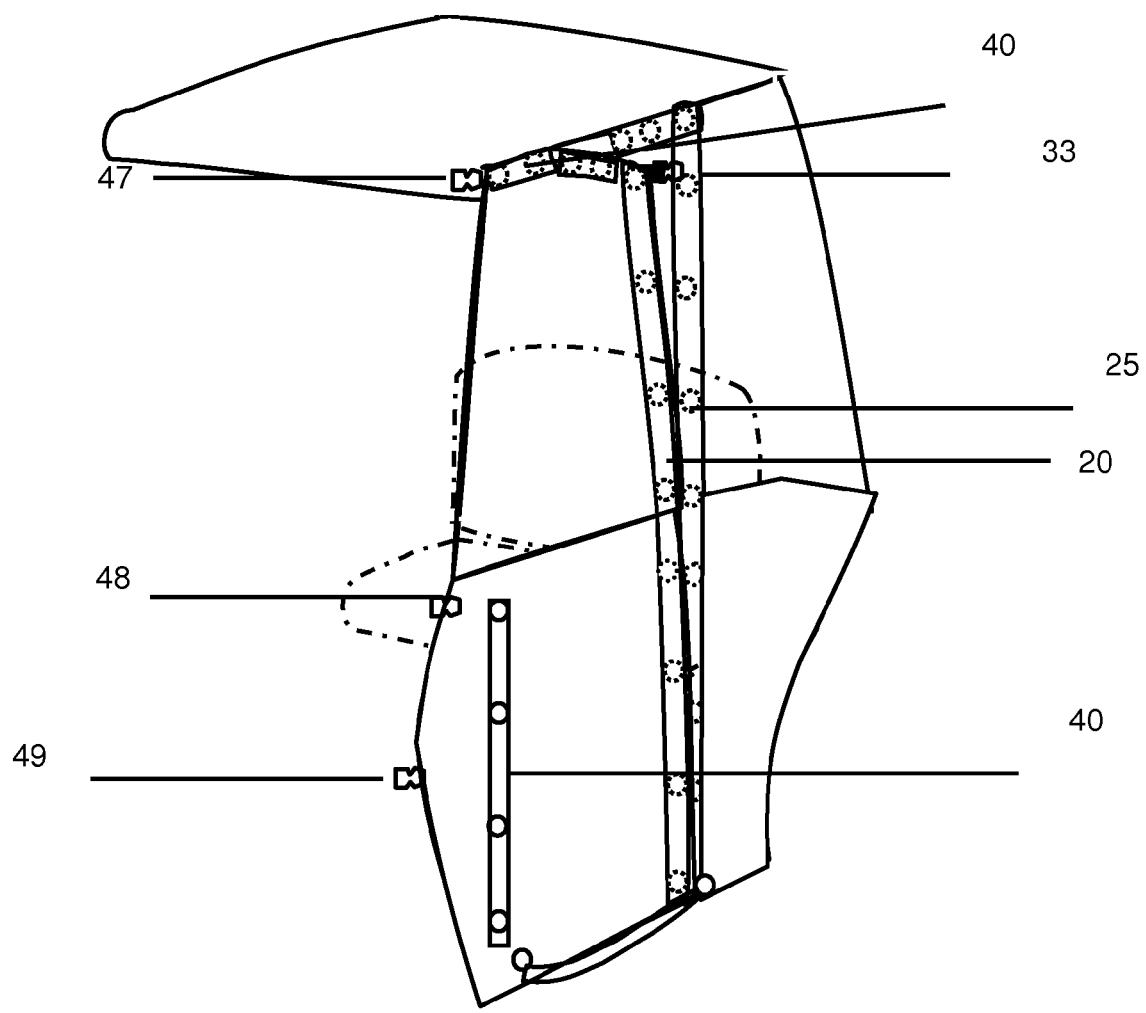
Figure 10A:
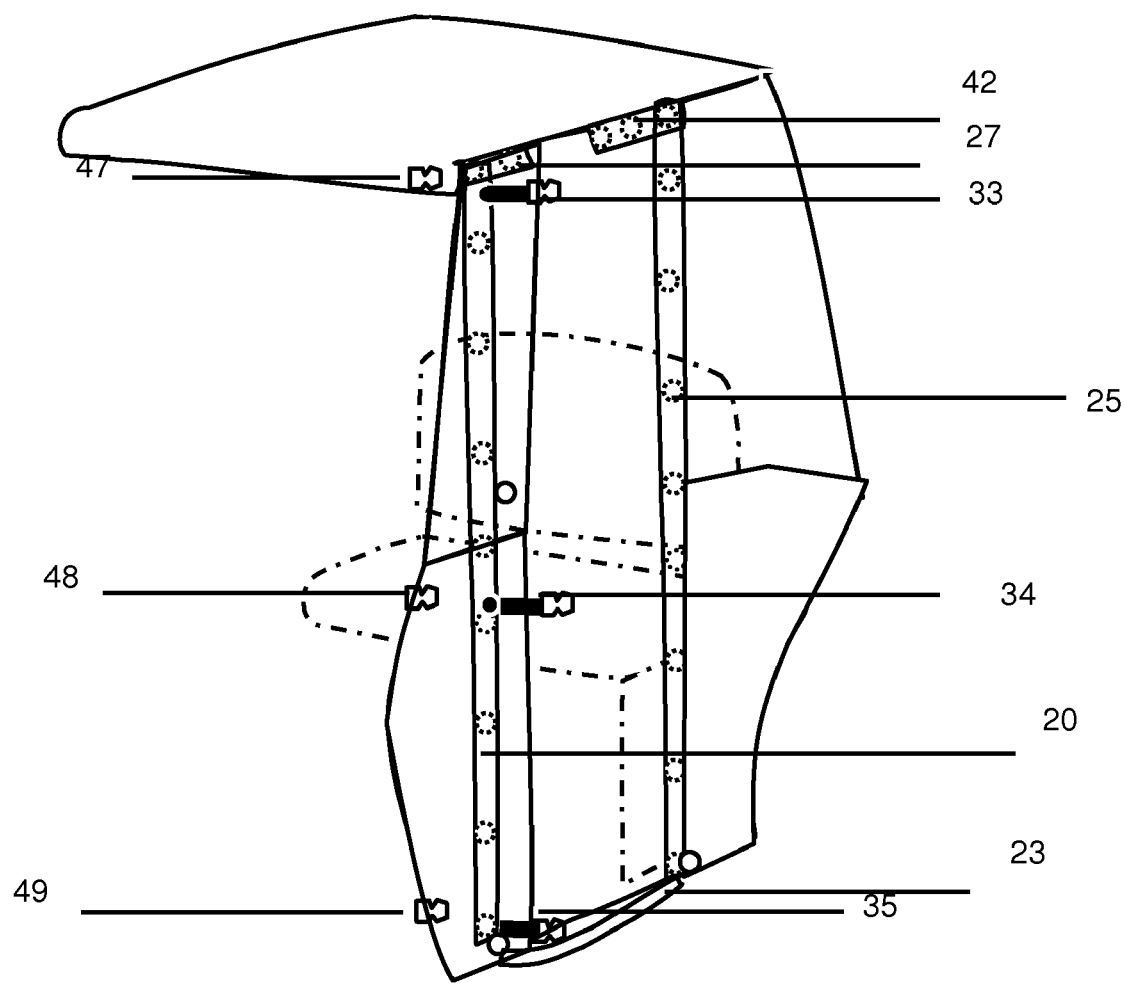
Figure 10B:
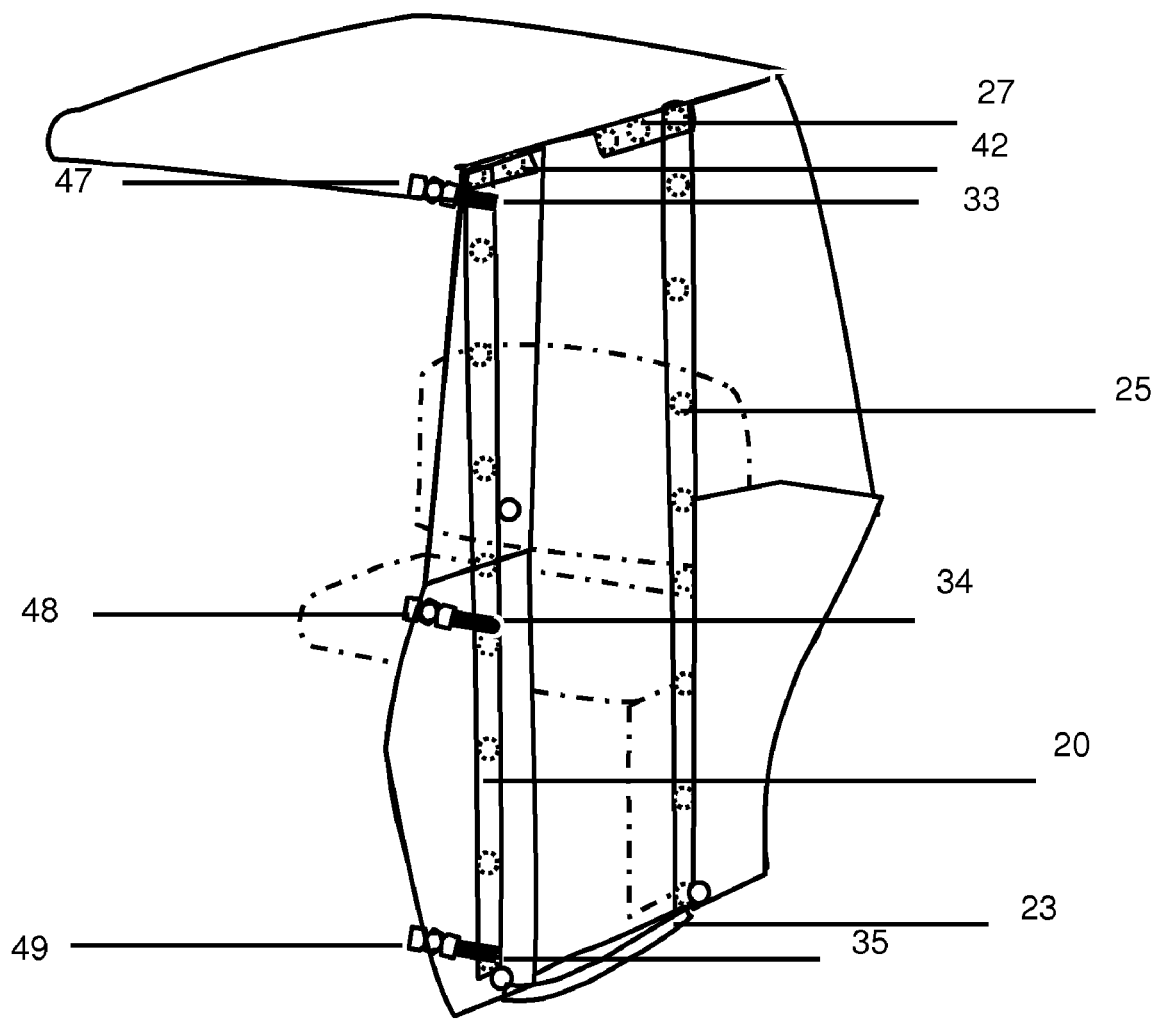

FIGS. 8, 9, and 10 shows an outside view of the closed magnetic door, partially opened magnetic door and fully opened magnetic door. FIG. 9 shows that the occupant simply pulls on the upper magnetic door open/close connector [33] causing the door magnetic strip to release from the side and top magnetic close strips [25] and [22] and begins to open. FIG. 8 shows that when closed, the door vertical magnetic strip [20] seeks and attaches to the side panel magnetic close strip [25] along the door edge. In FIG. 10A the door opening is completed by pulling the door towards the open magnetic strip [40] and allowing the door magnetic strip [20] to seek and attach to the side and top open magnetic strips [40] and [42]. When completely opened, a generous opening is created. When closed, the top panel magnetic close strip [27] may be folded over topside of cart door to seal door top from rain. Alternately FIG. 10B shows the left side door close strap [33], [34], and [35] connectors connected to the open door left side open connectors [46], [47] and [48].

Figure 11:
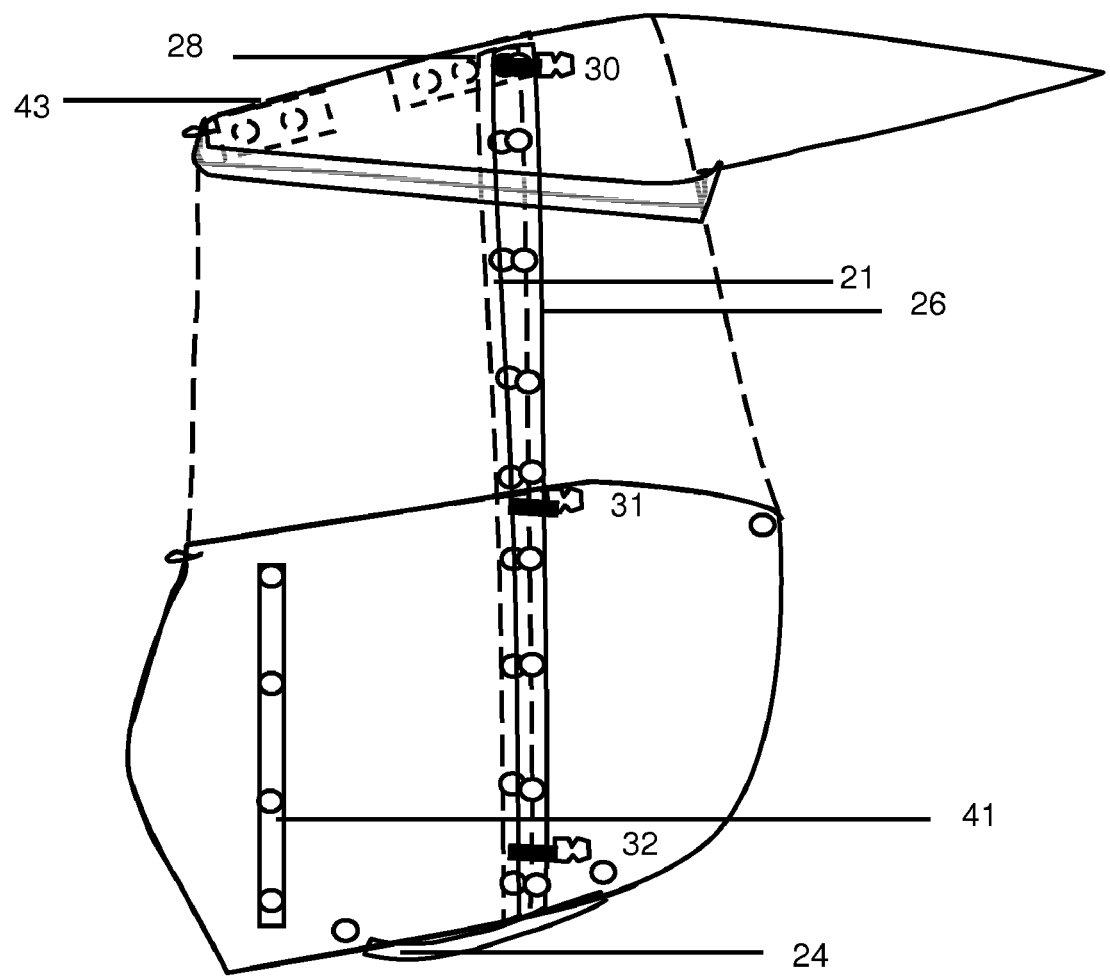

FIG. 11 shows an inside view of the right side magnetic cart cover door in the closed position. The door close connectors [30] [31] [32] are available from the inside to assist the occupant to guide the magnetic strips together as desired. The door vertical magnetic strip [21] and side magnetic close strip [26] are visible from the inside along with the vertical close magnetic strip [41] and the right side door support strap [24].

Figure 12A:
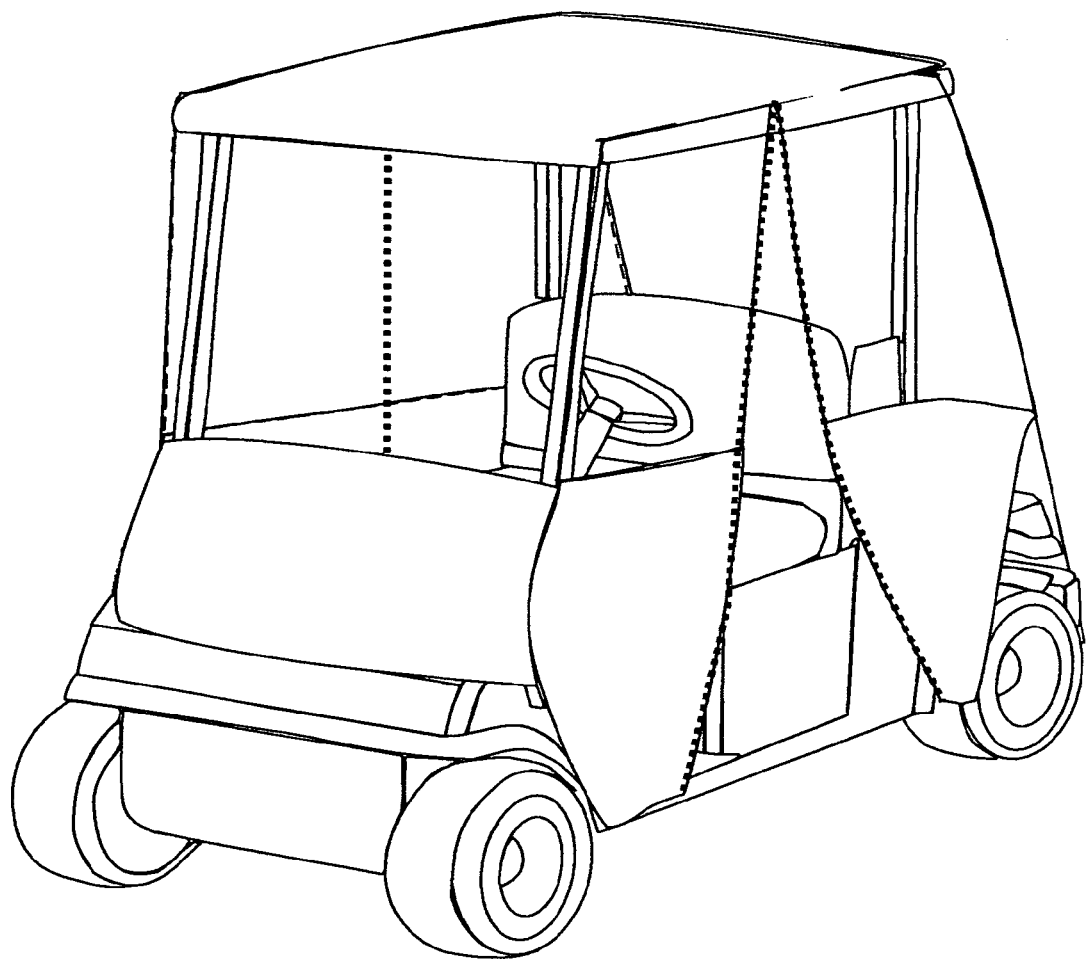
FIG. 12A—is a view of a typical zippered cover on a golf cart
Figure 12B:
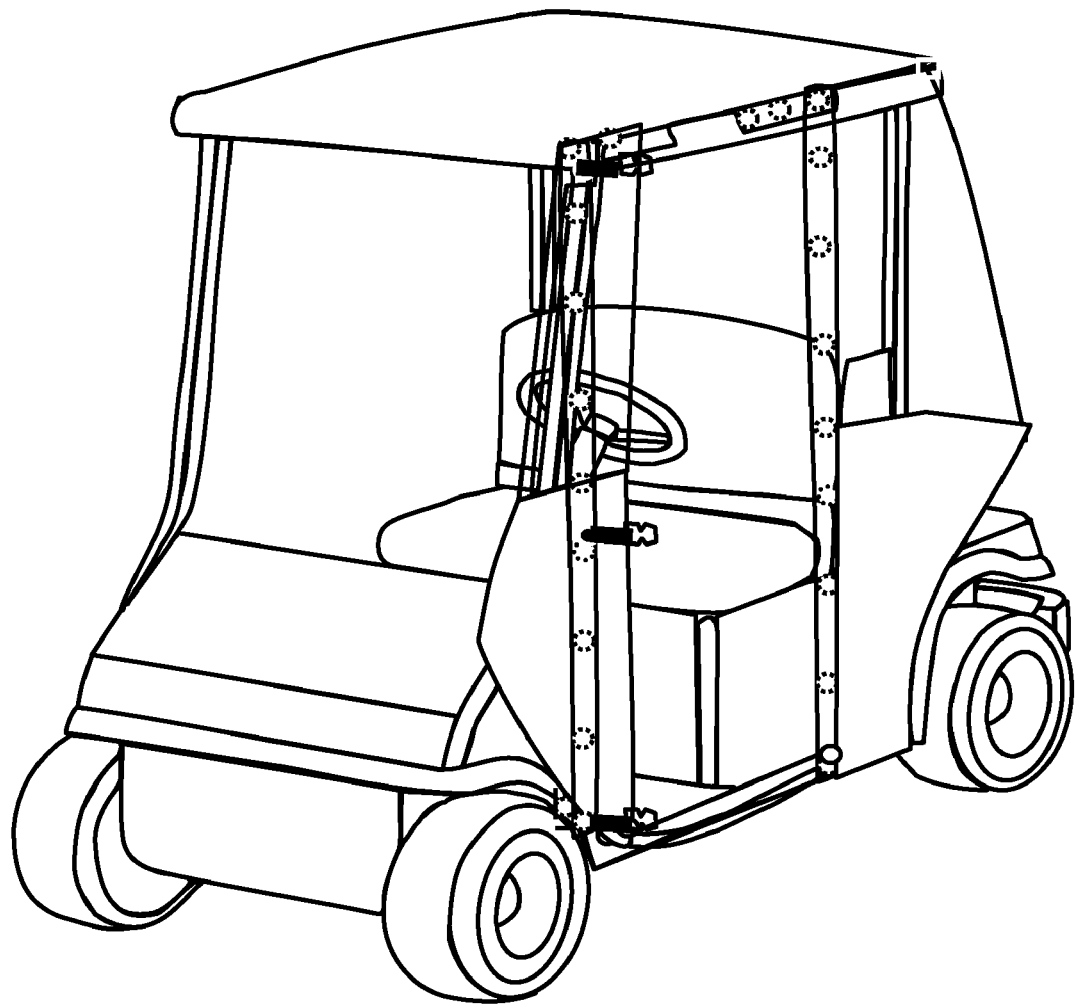
FIG. 12B—is a view of a magnetic door cover on a golf cart.

FIG. 12A shows a zippered cart cover installed on a typical golf cart, with the left side open and FIG. 12B shows a magnetic door cart cover installed on a typical golf cart, with the left side door in the open position. FIG. 12A shows the restricted opening in the zippered golf cart cover. FIG. 12B shows the spacious door opening of the magnetic door.

Magnetic Door Features Legend

6 Rare earth magnet
7 Magnet strip
8 Magnetic strip
9 Magnet pocket
10 Rare Earth Magnets
11 Rare Earth magnet pull
20 Left Door vertical magnet strip
21 Right Door vertical magnet strip
22 Left Door top magnet strip
22A Right Door top magnet strip
23 Left Door Support Strap
24 Right door support strap
25 Left Side panel magnet close strip
26 Right Side panel magnet close strip
27 Left Top panel magnet close strip
28 Right top panel magnet close strip
30 Right Upper Magnetic Door close connector
31 Right Middle Magnetic Door close connector
32 Right Lower Magnetic Door close connector
33 Left Upper Magnetic door close connector
34 Left Middle Magnetic door close connector
35 Left Lower Magnetic door close connector
40 Left Side panel lower open magnet strip
41 Right Side panel lower open magnet strip
42 Left Side panel upper open magnet strip
43 Right Side panel upper open magnet strip
44 Right side upper door open connector
45 Right side middle door open connector
46 Right side lower door open connector
47 Left side upper door open connector
48 Left side middle door open connector
49 Left side lower door open connector
50 Roof
51 Occupant interior
52 Cart Body
53 Front Right roof support post
54 Front left roof support post
55 Rear right roof support post
56 Rear left roof support post

What is claimed:

1. A door and door frame subassembly for a golf cart enclosure, the golf cart includes a roof, the subassembly comprises:

a horizontal swing-away open door that can move between a closed position and an open position adapted to allow access to the interior and exterior of the golf cart when installed, the swing-away door has a top edge, a rear edge, and a bottom edge;

a permanent horizontal magnetic strip attached along the top edge of the swing-away open door, the magnetic strip is formed with pockets containing permanent magnets;

a permanent vertical magnetic strip attached along the rear edge of the swing-away open door, the magnetic door is formed with pockets containing permanent magnets;

a subassembly forward side panel integral to and in front of the swing-away open door;

a permanent horizontal magnetic strip attached along a top edge of the subassembly forward side panel, the magnetic strip is formed with pockets containing permanent magnets;

a permanent vertical magnetic strip attached along a forward edge of the subassembly forward side panel, the magnetic strip is formed with pockets containing permanent magnets;

and subassembly roof panel above the closed swing-away open door;

a permanent horizontal magnetic strip attached along a side edge of the subassembly roof panel is formed with pockets containing permanent magnets;

a subassembly rearward side panel behind the swing-away open door;

a permanent vertical magnetic strip attached along a forward edge of the subassembly rearward side panel;

the permanent vertical magnetic strip of the subassembly rearward side panel and the permanent horizontal magnetic strip affixed to the enclosure roof panel cooperate with the permanent vertical magnetic strip and the permanent horizontal magnetic strip of the swing-away open door to magnetically fasten the door in the closed position; and, the permanent vertical magnetic strip and permanent horizontal strip of the swing-away open door cooperate with the permanent vertical magnetic strip and the permanent horizontal magnetic strip of the subassembly forward side panel to magnetically fasten the door in the open position.

2. The door and door frame subassembly for a golf cart enclosure, as set forth in claim 1, wherein each pocket of the door's vertical magnetic strip is larger than its magnet allowing for magnet movement in said pocket to compensate for size differences to ensure reliable door closing.

3. The enclosure subassembly for a golf cart enclosure as set forth in claim 1, wherein each pocket of the magnetic strips of enclosure subassembly forward side panel is larger than its magnet for allowing movement in said pocket to compensate for size differences and each pocket of the magnetic strip of the enclosure subassembly rearward side panel is larger than its magnet for allowing movement in said pocket to compensate for size differences.

4. The enclosure subassembly as set forth in claim 1, wherein each pocket of the door's horizontal magnetic strip is larger than its magnet allowing for magnet movement in said pocket to compensate for size differences, where said horizontal magnetic strip is positioned to allow said magnets to meet and attach to cooperating magnets housed in a horizontal magnetic strip containing magnet pockets affixed to the enclosure roof panel.

5. The enclosure subassembly as set forth in claim 1, wherein said swing-away open door can be affixed to enclosure subassembly forward side panel using connectors in addition to magnets, wherein the connectors are one of slide-release buckles, hook connectors, and hook and loop fasteners.

6. A door and door frame enclosure subassembly for a golf cart, the enclosure subassembly comprises a horizontal swing-away door, a roof, and a door side panel, the swing-away door has vertical and horizontal magnetic strips with pockets containing permanent magnets, a cooperating vertical open magnetic strip is located on the door side panel and a cooperating horizontal magnetic strip is located on the roof, when the door is horizontally swung open towards the front of the enclosure subassembly, the door vertical magnetic strip and the door horizontal magnetic strip connect to the vertical open magnetic and the horizontal magnetic strip of the roof to secure the door in the open position.

7. The enclosure subassembly as set forth in claim 6, wherein said horizontal swing-away door has supplemental connectors that attach to cooperative components on a front corner of the enclosure subassembly roof and side panel to secure the door in the open position on the outside of the enclosure, the supplemental connectors are one of hook and loop fasteners and snap fasteners.

8. The enclosure subassembly as set forth in claim 6, wherein the golf cart has a roof supported by metal front support posts, said horizontal swing-away door may be opened inwardly towards the golf cart metal support posts, causing the permanent magnets to be attracted to said metal support posts, and said horizontal swing-away magnetic door secured in the open position.

* * * * *